Dec. 16, 1924.          1,519,628
W. J. PEELLE
VACUUM SEALING CAP FOR FRUIT JARS AND THE LIKE
Filed Jan. 12, 1924

Inventor:
Willis J. Peelle,
By Chindahl, Parker & Carlson
Attys.

Patented Dec. 16, 1924.

1,519,628

UNITED STATES PATENT OFFICE.

WILLIS J. PEELLE, OF CHICAGO, ILLINOIS.

VACUUM-SEALING CAP FOR FRUIT JARS AND THE LIKE.

Application filed January 12, 1924. Serial No. 685,788.

*To all whom it may concern:*

Be it known that I, WILLIS J. PEELLE, a citizen of the United States, residing at Chicago, in the county of Cook and State of Illinois, have invented a certain new and useful Vacuum-Sealing Cap for Fruit Jars and the like, of which the following is a specification.

The invention relates to a cap for sealing glass jars of the type commonly known as Mason fruit jars. This type of jar as originally manufactured and sold was provided with a relatively short neck externally screw-threaded and the shoulder at the base of the neck was utilized as the sealing seat. As more recently made, these jars are provided with somewhat longer necks and spaced a short distance above the annular shoulder is an annular bead or flange constituting the sealing seat or "ball". The caps are, of course, screw-threaded and the cured rubber packing or sealing ring is employed between the cap and the sealing seat. Also, the cap is usually equipped with a porcelain or glass liner.

Experience has definitely established that the screw caps provided for such jars have failed in a large percentage of cases to produce an effectual seal and the reason is that the cured rubber rings become stretched and distorted in the operation of screwing the cap onto the jar, and such caps have otherwise failed because of the inability of the rubber to adjust itself to imperfections in the glass. Moreover, with the cap mechanically secured in position as by means of screw threads, the home canner is deceived by the apparent tightness of the cap into thinking that an air-tight or vacuum seal has been obtained in all cases, and the result is that the contents of the jars become in many instances totally or partially spoiled. Still another objection to the common type of screw cap is that the glass or porcelain liner employed is permanently fastened in place but is loosely held so that after the cap has been in use, it is impossible to cleanse it thoroughly with the result that the liner serves to harbor destructive bacteria.

The primary object of my invention is to produce a cap for glass jars of the Mason type which will render it possible to obtain with such jars an effectual vacuum seal without the necessity of employing expensive vacuum sealing machinery and equipment, thus bringing the vacuum seal within the reach of the domestic canner who is largely supplied with such jars.

Another object is to provide a cap which is adapted for use by the commercial food packer rendering it possible for him to obtain a vacuum seal in a much larger percentage of cases than is now possible, while at the same time enabling him to dispense with screw threads on the jars, and consequently to increase the size of the jar opening to receive larger units of fruit or other food products.

A further object is to produce a cap which may be quickly and easily applied and which will indicate to the canner whether or not the seal is perfect.

Another object is to produce a jar cap providing a double seal on two separate sealing seats, which cap is especially adapted for use by the commercial food packer.

Still another and ancillary object is to provide a cap which may be so cheaply manufactured and sold as to make it practicable to discard the caps after having once been used.

In the accompanying drawings, Figure 1 is a fragmentary elevational view of the upper portion of a Mason jar of the "ball" type having a cap constructed in accordance with my invention applied thereto.

Figs. 6 and 7 illustrate slightly different forms of caps especially designed for use by commercial food packers having machinery for securing the caps onto the jars and thus dispensing with the use of spring clamps and the like.

Figure 1:
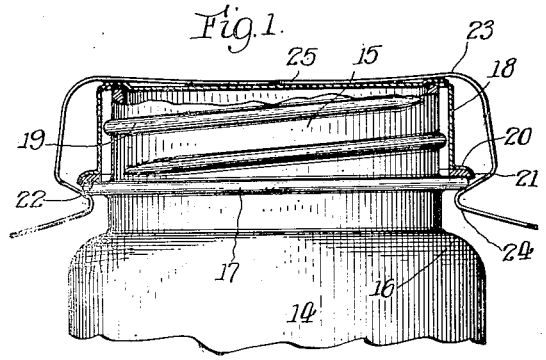
Figure 2:
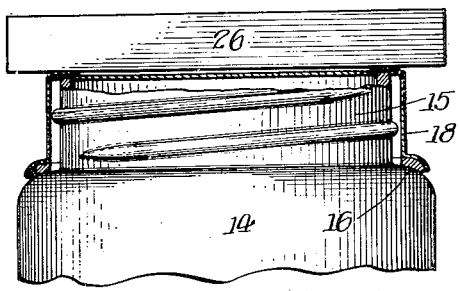
Fig. 2 is a similar view illustrating the application of a cap to an old style Mason jar.
Figure 3:
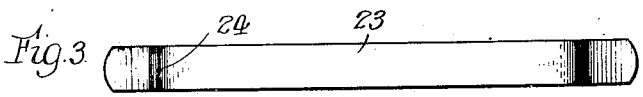
Fig. 3 is a plan view of a spring clamp employed in applying the caps to the "ball" type of jar as shown in Fig. 1.

Referring first to Figs. 1 and 2, the jars which are therein shown are respectively the "ball" type of Mason jar and the so-called old style jar. The former comprises the usual body 14 having a relatively elongated neck 15 of reduced diameter as compared to the body so as to provide an annular shoulder 16. Spaced a short distance above the shoulder on the neck is an annular bead or flange 17 which is commonly termed the sealing seat. In the case of the old style jar the neck 15 is shorter and the shoulder 16 is utilized as the sealing seat.

In carrying out my invention I utilize the sealing seats which are provided upon both styles of Mason jars as above set forth, in combination with a cap which is so constructed as to provide as a part thereof a sealing ring or gasket of a preferred composition including raw rubber, the gasket being secured in position by a preferred method forming no part of this invention. I have found that said sealing seats can be utilized notwithstanding the presence of the screw threads, by providing a relatively deep cap arranged to fit loosely over the neck of the jar and having its lower end constructed so as to carry the composition rubber gasket. In Figs. 1 and 2 the cap is designated by the numeral 18 and is shown as having a plain cylindrical wall fitting loosely over the screw threads 19. At its lower end the cap is formed with an outturned flange 20 which is preferably curved downwardly near its outer end as shown at 21. Upon the under and inner sides of this flange I secure the gasket which is designated by the numeral 22. The cap is by preference made to fit loosely over the neck of the jar to avoid any possibility of its sticking to the neck by frictional engagement therewith which might interfere with the proper seating of the cap.

In applying this cap to a ball type of jar a clamp 23 may be employed. This clamp is in the form of a U-shaped spring clip having near its opposite ends inwardly bent hook portions 24 and bearing at its central portion 25 upon the top of the cap. The contents of the jar are introduced while boiling or substantially so, so that the jar becomes heated. It will be apparent, therefore, that when the gasket 22 is forced downwardly upon the sealing seat by pressure applied through the clamp 23, the gasket will readily adjust itself to any slight imperfections in the seat. As the contents of the can cool, the contraction thereof incident to the cooling operation produces a vacuum in the jar. When the jar is completely cooled, the clamp may be removed and the effectiveness of the seal is readily apparent if the cap remains securely held in position. An additional test of the effectiveness of the seal is to note whether the relatively thin metal of the top of the cap is drawn inwardly.

In the case of the old style jar shown in Fig. 2, the absence of the ball 17 renders it necessary to employ other means for holding the cap applied while the contents of the jar are cooling. I have shown a suitable weight 26 for this purpose.

Figure 4:
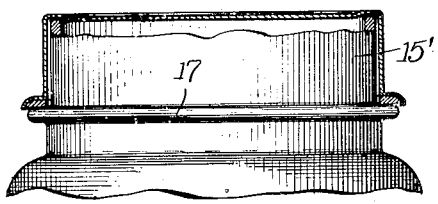
Figs. 4 and 5 illustrate my improved cap applied to modified forms of the "ball" type of jar and the old style Mason jar, the screw threads being absent.
Figure 5:
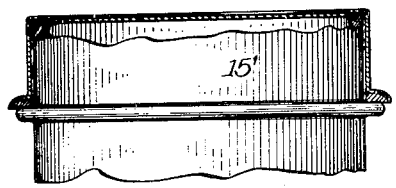

It will be apparent that with my improved cap the screw threads 19 on the jar neck serve no function and may therefore be ultimately dispensed with entirely. As a result, the internal diameter of the neck may be increased as will be readily apparent from Figs. 4 and 5 thus permitting of the introduction of larger units of fruit or other food products into the jar. The plain necks shown in these types of jars are designated by the numeral 15'.

Figure 6:
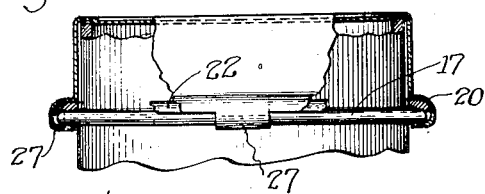
Figure 7:
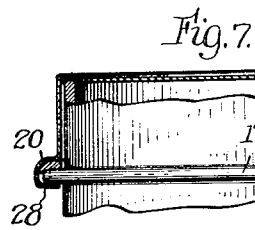

In the use of my invention by large commercial food packers, it may be preferred to dispense with clamps such as shown in Fig. 1 and employ instead hooks or flanges which by the use of suitable machinery may be bent or rolled into holding engagement with the ball 17. In Fig. 6 I have shown a cap provided at spaced points about its lower edge with portions 27 bent to form hooks engaging with the underside of the sealing seat or ball; and in the case of Fig. 7 I have shown an annular inturned flange 28 formed intergral with the flange 20 and bent into engagement with the under side of the ball 17. Presumably also such packers will prefer jars having the screw threads omitted; and I contemplate that they may if desired pass the jars through an automatic vacuum sealing machine of the type shown in my copending application Serial No. 500,724, filed September 15, 1921, applying just enough mechanically produced vacuum to hold on the cap without withdrawing the hot contents of the jars. The increased vacuum thus produced provides a very practical seal which will withstand rough usage in shipment.

Figure 8:
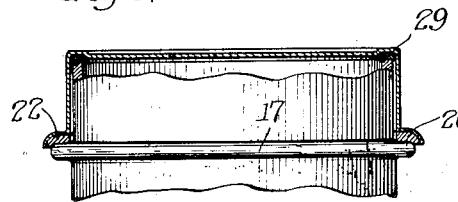
Fig. 8 illustrates a modified form of cap providing a double seal on separate sealing seats.
Figure 9:
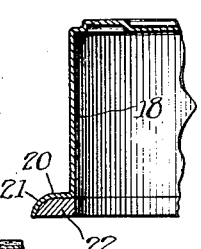
Fig. 9 is a central sectional view showing on an enlarged scale the cap illustrated in Fig. 1.

In Fig. 8 I have shown a cap providing a double seal. In this form the cap has secured thereto upon the under side of the top wall of the cap and at its inner peripheral edge a gasket 29 which is adapted to engage with the extreme upper end of the jar constituting a second sealing seat. In addition, I provide the cap with a gasket 20 as in Figs. 1 to 7 which is adapted to coact with the ball 17. The gasket 29 in this case is auxiliary in character to the gasket 20 because it has been found in practice that in a large number of cases Mason jars are produced with their upper ends slightly imperfect due to the presence of vertical cracks formed in such surfaces in the molding operation. These cracks or crevices are of such a character that when present cannot effectually be sealed even with a composition gasket.

Figure 10:
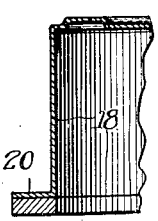
Figs. 10 to 13 are similar views showing additional forms of the cap.
Figure 11:
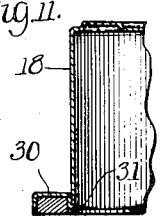
Figure 12:
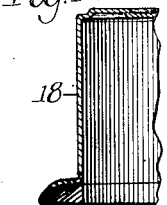
Figure 13:
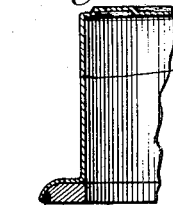

The downturned portion 21 of the flange 20 in the case of the cap shown in Figs. 1 to 9 serves, it will be apparent, to protect the outer edge of the gasket 22 and to prevent the gasket from being forced out between the cap and the sealing seat when pressure is applied to the cap. Other forms of flanges accomplishing this result are shown in Figs. 11, 12 and 13. In Fig. 11 the flange is shaped to form an annular U-shaped socket 30 of which the inner wall 31 is made somewhat shorter than the outer wall. In Fig. 12 the edge of the flange is folded back as at 32, and in Fig. 13 the edge is beaded as at 33. In Fig. 10 an extremely simple form of cap is shown, the flange 20 being straight and without any protecting edge portion.

In removing the cap the same may be pierced to permit the entrance of air to the jar and thus destroy the seal, or a knife may be inserted between the gasket and its seat. If the latter operation is performed carefully so as not to injure the gasket, the cap may be used again.

I claim as my invention:

A cap adapted for sealing conventional screw thread jars of the Mason type, said jars having a sealing seat and an upstanding neck thereabove of standard length and size, said cap comprising a top wall, a skirt portion and a flange at the bottom thereof, adapted to receive a raw rubber composition gasket, the length and size of said skirt portion being so chosen with respect to the standard dimensions of the said upstanding neck that said cap when applied to one of said standard Mason jars will hermetically seal the same.

In testimony whereof, I have hereunto affixed my signature.

WILLIS J. PEELLE.